US006309492B1

(12) United States Patent
Seidner

(10) Patent No.: US 6,309,492 B1
(45) Date of Patent: Oct. 30, 2001

(54) POLYMER FILL COATING FOR LAMINATE OR COMPOSITE WOOD PRODUCTS AND METHOD OF MAKING SAME

(76) Inventor: Marc A. Seidner, 234 Conway Ave., Los Angeles, CA (US) 90024

( * ) Notice: Subject to any disclaimer, the term of this patent is extended or adjusted under 35 U.S.C. 154(b) by 0 days.

(21) Appl. No.: 09/154,615

(22) Filed: Sep. 16, 1998

(51) Int. Cl.[7] .......................... B29C 73/00; B32B 31/12

(52) U.S. Cl. .......................... 156/94; 156/280; 156/289; 427/140; 427/393

(58) Field of Search .......................... 156/94, 280, 289; 427/140, 393, 397, 299, 317

(56) References Cited

U.S. PATENT DOCUMENTS

| | | | | |
|---|---|---|---|---|
| 2,343,740 | * | 3/1944 | Birmingham | 154/40 |
| 2,601,349 | * | 6/1952 | Welch | 156/235 |
| 3,308,013 | * | 3/1967 | Bryant . | |
| 3,457,094 | * | 7/1969 | Elmendorf et al. | 156/94 |
| 3,519,468 | * | 7/1970 | Brown | 427/393 |
| 3,695,968 | * | 10/1972 | Morrison | 156/216 |
| 3,793,113 | | 2/1974 | Pearson | 156/335 |
| 3,895,984 | | 7/1975 | Cone et al. | 156/290 |
| 4,030,955 | * | 6/1977 | Antonie et al. | 156/289 |
| 4,308,298 | * | 12/1981 | Chen | 156/94 |
| 4,539,045 | * | 9/1985 | Wagner | 427/397 |
| 4,541,880 | | 9/1985 | Arena et al. | 156/94 |
| 4,743,484 | * | 5/1988 | Robbins | 428/106 |
| 5,057,591 | | 10/1991 | Detlefsen et al. | 156/291 |
| 5,234,747 | | 8/1993 | Walser et al. | 428/215 |
| 5,643,983 | | 7/1997 | Lee | 524/267 |
| 5,652,065 | | 7/1997 | Park et al. | 428/537.1 |
| 5,700,587 | | 12/1997 | Shiau et al. | 156/335 |
| 5,810,956 | * | 9/1998 | Tanis et al. | 156/295 |

FOREIGN PATENT DOCUMENTS

| | | | | |
|---|---|---|---|---|
| 462586 | * | 12/1991 | (EP) . | |
| 1213337 | * | 11/1970 | (GB) | 427/393 |
| 55-156055 | * | 12/1980 | (JP) | 156/280 |
| WO 93/19858 | * | 10/1993 | (WO) | 427/393 |

* cited by examiner

*Primary Examiner*—Steven D. Maki
(74) *Attorney, Agent, or Firm*—Christie, Parker & Hale, LLP

(57) ABSTRACT

A method for coating laminate and composite wood products with a polymer coating. The method includes providing a wood substrate consisting of an engineered or composite wood product, applying a flowable but thixotropic polymer coating material to the surface of the substrate, distributing the polymer coating material evenly across the surface of the wood substrate to create a continuous smooth surface, and allowing the polymer coating material to bond to the surface of the wood substrate to form a hard smooth surface over the wood substrate surface.

25 Claims, 4 Drawing Sheets

POLYMER FILL COATING FOR LAMINATE OR COMPOSITE WOOD PRODUCTS AND METHOD OF MAKING SAME

The present invention relates to a method for coating wood panel laminate or composite panel products with a pumpable or sprayable polymer or plastic coating to improve the durability, strength and appearance of the product, and to a laminated or composite wood product that can be made in this way.

BACKGROUND OF THE INVENTION

Wood panel laminates and composite wood panel products, such as, for example, plywood, laminated veneer lumber (LVL), oriented strand board (OSB), and particle board (PB), are widely used in the building and construction process and in the fabrication of a wide variety of building components and structures, including furniture, cabinetry, and boxes, large and small. These laminate and composite products offer improved strength, unique dimensional or fabrication characteristics, and greater availability and versatility compared to natural solid wood or lumber, while costing significantly less than natural solid wood and requiring less labor to prepare and make ready for use by consumers.

One significant drawback to the use of many of these manufactured wood panel products, however, is that they have a rough, industrial appearance and are generally less cosmetically attractive than solid wood. Because these products are usually mass produced from veneers of wood, strands and flakes of assorted wood fiber, or chips and particles of wood randomly bonded together, the face and edge surfaces of the products are usually coarse, grainy, rough, and include imperfections such as splits, gaps, stained wood, discolored resin and knots, which usually detract from the cosmetic appearance of the product, and limit functional uses and fabrication of derivative products.

Another disadvantage is that the rough gaps and coarse, flashy raised grain of many types of wood laminate and composite panels products show or "telegraph" through many types of conventional cosmetic appearance improving or protective coatings or overlays, such as thin veneer, paper and vinyl sheet laminating layers and paint. One common way to try to improve the surface appearance of laminate panel wood products, especially veneer and laminated products, such as plywood and LVL, is to use a procedure known as "plug and touch sanding." In this procedure, each surface layer of veneer is inspected for large knots or imperfections. Prior to laminating, an operator removes these imperfections with a hydraulic punch, cutting out the imperfection in a preselected shape. The holes thus formed are filled with wooden plugs which have been pre-cut to the same shape as the hole. After laminating, the surface layers of the resulting wood panel are inspected again, and rough spots, and the plugs themselves, are sanded to help smooth the surface of the product. Any remaining defects in the surfaces of the laminated product can then be removed by using a router to create a depression where the defect was, and then adding a putty or patching compound by hand prior to a final sanding of a panel. Each of these procedures is labor intensive, time consuming and expensive. The resulting product, while improved, is still not suitable for many applications for which an attractive appearance or a smooth surface is desired.

Wood products manufactured in the above manner are sometimes used as, for example, concrete form boards for poured concrete. Surface imperfections are telegraphed onto the surface of the finished concrete. Typically, these concrete form products must additionally undergo a process to apply a clear, defect-free hardwood overlay to the substrate to prevent substrate defects from telegraphing. Normally, a sheet of high quality hardwood veneer which is free of large imperfections is laminated to a very thin, smooth, water-resistant, resin impregnated paper called a Medium Density Overlay (MDO) and attached using a press in the normal laminate pressing process, or is glued onto the laminated wood product in a roll coating process after the laminate pressing is complete. Thus, the combination of a hardwood and MDO overlay provides a smooth, clean surface by which the MDO contacts the wet cement so that no imperfections remain in the surface of the wood laminate product and, thus, no defects are be telegraphed to the surface of the finished concrete. This process, however, is labor and material intensive and significantly increases the cost of concrete form board due to the expense of the hardwood overlay and the MDO resin paper overlay.

In many other applications, conventional wood products suffer from the additional disadvantage that they are water permeable, which can result in staining, swelling, dimensional distortion, deterioration or even disintegration.

In view of the above, it should be appreciated that there is a need for a method and product that improves the performance and appearance of wood laminate and composite wood products that is inexpensive, labor efficient, and results in a continuous homogenous smooth surface that is substantially free of imperfections, is suitable for refabrication, painting or other cosmetic enhancement, and does not materially reduce the structural strength or dimensional stability of the product, but does increase resistance to water damage. The present invention satisfies these and other needs and provides further related advantages.

SUMMARY OF THE INVENTION

One aspect of the present invention resides in a method for coating wood laminate or composite products with a pumpable or sprayable polymer or plastic coating. The process may include some or all of the following steps: (1) applying a thermal setting adhesive to a plurality of sheets of wood veneer or mixing the thermal setting adhesive with wood fragments; (2) heating the wood veneer or wood fragments to a temperature above ambient temperature and applying pressure to the wood veneer or wood fragments, thereby causing the wood to bond as a result of the thermal setting adhesive, creating a wood substrate; (3) applying a flowable but thixotropic polymer coating material to one or more surfaces of the wood substrate before the wood substrate cools to ambient temperature; (4) distributing the polymer coating material smoothly across one or more surfaces of the wood substrate such that holes and imperfections in the surface are filled and a smooth continuous surface is created; and (5) allowing the polymer coating material to bond to one or more surfaces of the wood substrate and cure to form one or more homogenous hard, smooth surfaces over the substrate. The process may also include the steps of coating the partially cured or gelled polymer with a release agent such as sawdust or sanding dust to prevent blocking of tacky panel surfaces and then, after the polymer has fully cured and hardened, sanding the solid hard surface to smooth to remove the release agent.

Preferably, the flowable but thixotropic polymer is a reaction spray elastomer (RSE) or pumpable elastomer. RSEs, which are known in the industry, include fast curing, solventless polyurethane, polyurea, polyester and hybrid blends. RSEs are 100% solids and consequently solvent-free. They have a cure time of 15 to 60 seconds, which reduces the labor expended on each wood substrate to be coated, and speeds production, therefore improving productivity of manufacturing facilities using the process. An added advantage of this solvent-free characteristic of RSEs is that the elimination of solvents helps manufacturing facilities using the above-referenced process to meet strict environmental standards relating to air quality. A still further advantage of this characteristic is that the RSE's have minimal shrinkage during curing, thus preventing an RSE coating applied to only one side of a wooden substrate from causing bowing or warping of the substrate.

An important feature of the method identified above is that it uses laminate or composite heat presses, which are common in the industry, and synergistically takes advantage of the residual heat which remains in a newly fabricated laminate or composite product to aide in the bonding and curing of the polymer coating. Because plural component polymer coatings such as RSE's generate heat by chemical reactions between their various components, in general, the application of more polymer to a surface results in more heat and therefore a better cure. The use of residual heat from the pressing process allows the polymer coating to be applied more thinly and obtain a better bond than would be possible without the use of residual heat. The result is a faster curing and stronger mechanical bond between the wood and the polymer than would, in many instances, be achieved if the coating were applied at ambient temperatures. In addition, the polymer coating imparts preferred characteristics of strength, smoothness, machinability and durability, and cures harder and in a shorter time when compared to non-heat-assisted coatings.

A related advantage resulting from the use of conventional single, multi-opening and continuous roll hot presses is that the process and variations thereof may be introduced into existing laminate and composite wood products plants with comparatively little disruption and expense. Equipment to carry out the process can, in most cases, be readily added to current manufacturing lines, allowing manufacturers to produce a valuable new product with cosmetic consistency of appearance and improved structural characteristics to their inventories with a minimum of added labor, equipment and modification.

Another advantage can result from the fact that the process is readily automated, eliminating the need for costly, labor intensive steps, such as plug and touch sanding, which are commonly used to improve the appearance of these types of wood products. Thus, use of these new processes can result in significant labor cost savings. The processes can also eliminate the need for costly hardwood or MDO overlays to improve surface appearance, thus reducing material costs of producing paintable, smooth, attractive wood laminate and composite products.

Another aspect of the invention resides in the laminate and composite products that can be made by the above process, which may have superior resistance to moisture, rot, insects and decay because of the nature of the polymer coating used.

Products may be coated on only one or two sides, to protect the surfaces intended to be exposed to the environment, or, for more complete protection, a product can be completely encapsulated and thus made substantially impervious to moisture penetration. In either case, a smooth, hard, durable weather resistant and cosmetically pleasing surface results.

The polymer coating can also strengthen the product. This is especially important for heat processed wood products, because the heat process of drying wood veneer, chips and flakes, and the subsequent hot pressing involved in the production of heat processed wood products removes much of the moisture from the raw material wood and can weaken or fracture cell and cellulose bonds. The polymer coating process helps restore some of the strength and rigidity lost in this way. Additionally, because the polymer coating is ideally applied while the core and surface of the panel product is still hot after pressing, the need for reheating, with further weakening of the cellulose bonds, is eliminated.

A related advantage resides in the fact that the surface of the coated product can be machined or embossed either before or after the coating dries to a hard surface to add decorative patterns, such as profiles, beads, plows, scrolls or simulated wood grain for shelving, siding, paneling or cabinetry. Finally, the dried coated surface can be further refabricated, machined, sawn, sanded and painted in a manner similar to any conventional engineered or composite wood product.

Other features and advantages of the present invention will become apparent from the following description of the preferred embodiments, taken in conjunction with the accompanying drawings, which illustrate, by way of example, the principles of the invention.

DESCRIPTION OF THE PREFERRED EMBODIMENTS

Figure 1:
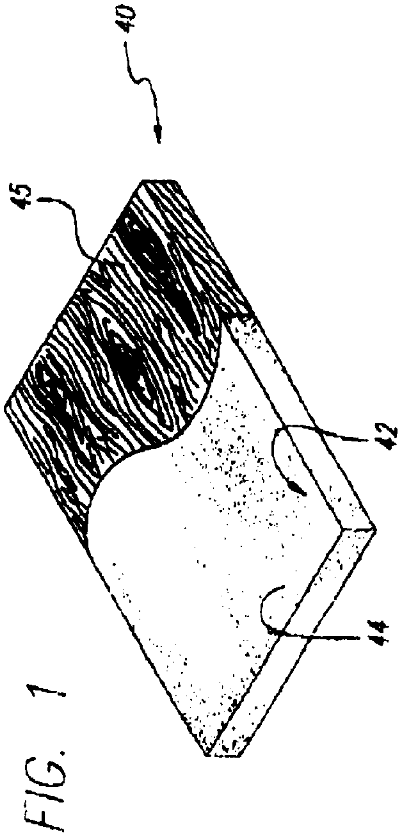
FIG. 1 is a cutaway view of a composite wood product in accordance with the present invention.

In one embodiment of the present invention, shown in FIG. 1, a composite wood product 40 is completely encapsulated with a polymer coating 42 by the method described below. The polymer coating 42 is bonded to and completely surrounds all surfaces of the wood substrate 45. This encapsulation renders the wood substrate substantially impervious to moisture damage, such as rotting or warping.

Figure 2:
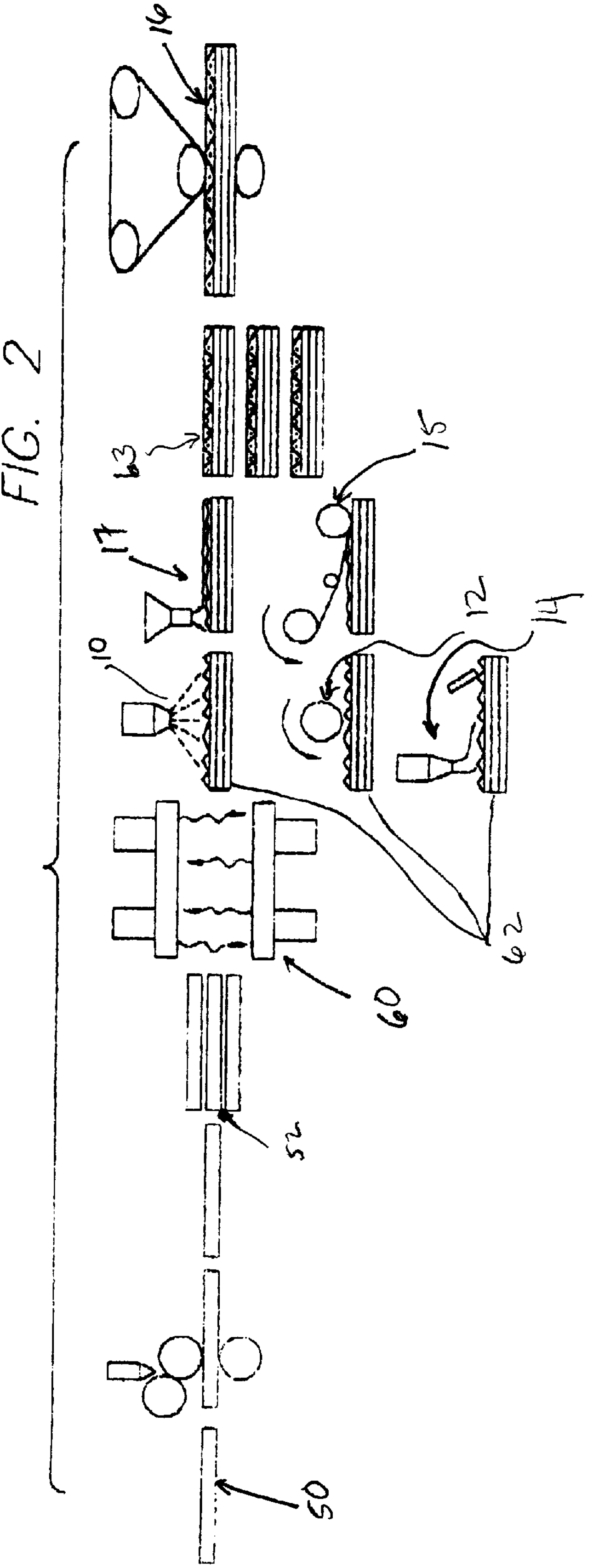
FIG. 2 is a schematic diagram showing the steps of the present method.

In one embodiment of the method by which this product 40 is made, a thermal setting adhesive, such as catalyzed polyvinyl acetate, phenyl formaldehyde, phenyl resourcenol, or MDI, is applied to sheets 50 of wood veneer. (see FIG. 2) These sheets 50 are then stacked. The sheets may be arranged so that the predominant direction of the wood grain 52 of each sheet is perpendicular to that of the adjacent sheets to produce plywood, or so that the predominant direction of the wood grain 52 is the same as that in adjacent sheets to produce laminated veneer lumber. After the sheets 52 are stacked, they are fed into a hot press 60. (FIGS. 2, 3A and 3B) This may be a multiple opening, single opening, or continuous opening press. There, the sheets of veneer 50 are heated above ambient temperature to in excess of 80° C. Press plates, which are usually heated, apply pressure to the stacked veneer sheets 50. This heat is conducted through the veneer layers and causes the thermal setting adhesive to bond the stacked sheets 50 into a single laminated wood substrate 62. Typically, during the laminating process the layers of wood substrate, which are to be cured into a panel, and the resin reaches temperatures of approximately 100° C. with the surface layers of the substrate normally reaching even higher temperatures than the core of the substrate.

As the wood substrate 62 is removed from the press, the surface temperature of the substrate 62 will remain substantially above the ambient temperature for a period of time as the core cools. Before the substrate cools to ambient temperature, and while it is still quite hot from the press resin curing process, a polymer coating is applied. This polymer coating should be chosen for the properties desired in the finished product. It may fill, level, smooth, texture, waterproof, seal or color the product or perform any combination of these purposes. The coating may be a meltable, flowable powder, a pumpable or extrudable polymer, a hydro cast polyester/polyurethane hybrid, or a reaction spray elastomer. This flowable but thixotropic polymer compound typically has plural components, such that one component catalyzes the polymer and generates heat during the curing process. These compounds may be self leveling, or textured or orange peeled. The coating may be applied through heated hoses and nozzles, by a spray 10, a roll coater 12, or a pump applicator coupled with a doctor knife or extrusion head 14. For a smooth, glassy surface, the polymer compound may then be smoothed across the surface of the wood substrate 62 with a roll coater, pinch rolls and doctor knife, or a screed and template to create a smooth, water impervious surface 63.

If a sheet is to be stacked before the chosen polymer cures and while it is still tacky, a removable waster sheet of plastic or paper may be applied to the coated surface. The waster sheet may be applied with a roll coater 15 so that the polymer coating is smoothed beneath the waster sheet in the application process. This will result in a smooth surface once the waster sheet is removed. The waster sheet may be removed by peeling it off or sanding it off 16.

Alternatively, a fine layer of sawdust, sanding dust, calcium carbonate or talc 17 may be sifted evenly onto the still tacky polymer. This dust serves as a buffer between layers of polymer coating to prevent each sheet from sticking to the next, an undesirable situation called "blocking." The fine layer of sanding dust can ultimately be removed in the subsequent panel sanding process or earlier by vacuuming the panel surface. In some applications it may be left on as an additional protection for the surface. As another alternative, a sheet of cosmetic enhancing material, such as melamine impregnated paper, resin coated papers or thin wood veneer may be permanently applied at this time.

Examples of flowable but thixotropic compounds include polyurethanes, polyesters, polyureas and hybrids mixtures of the foregoing. Additionally, reaction spray elastomers may be used. Commercially available formulations which may be used as the flowable but thixotropic polymer include, but are not limited to, Futura Polyurethanes, Laminex™ Pumpable Body Compound, Laminex™ Sprayable Syntactic Compound, Devcon Plexis™, Bondo Body Filler, Fibreglass Evercoat and Willamette Valley Co. Polypatch and Polyquick. A number of commercial chemical companies are known to formulate polymers for a variety of industrial uses. The examples given herein are by way of example only and not intended to limit types of polymer compounds used in the method described herein. Polyester formulations may be catalyzed by methyl ethyl ketone peroxide or benzoyl peroxide. Polyurethane may be catalyzed with an isocyanate. Other polymers may be catalyzed with methyl acrylate. All formulations may have optional fillers including calcium carbonate, talc, glass microspheres and even sawdust. Although these polymer compounds may be applied to a solitary panel in a secondary processing operation on a piece by piece basis after the board has cooled to ambient temperatures, the residual higher wood substrate surface temperatures found in still cooling post pressed board provide a unique and preferred surface environment for the application of these compounds.

Preferred surface temperatures for post pressing applications range from about 50° C. to about 90° C., depending on the characteristics of the polymer chosen. The polymer compounds are preferably be applied at wood substrate surface temperatures ranging from about 20° C. to about 90° C., more preferably about 40° C. to about 50° C. The specific composition of the polymer compound used may be varied to meet different cosmetic requirements, durability requirements or other customer specifications. Polyester is more appropriate for applications which require thick coatings for levelling and deep filling of voids across the face of the panel, and those in which a hard, smooth, highly paintable waterproof surface is desired. Polyurethane is more appropriate when using substrates with fewer defects and patching is desired, and when a less hard laminating and more easily machineable surface is needed for further processing. Polyurea can be used when higher strength skin properties or high resistance to acids or solvents and cladding without levelling or filling is necessary.

Figure 3A:
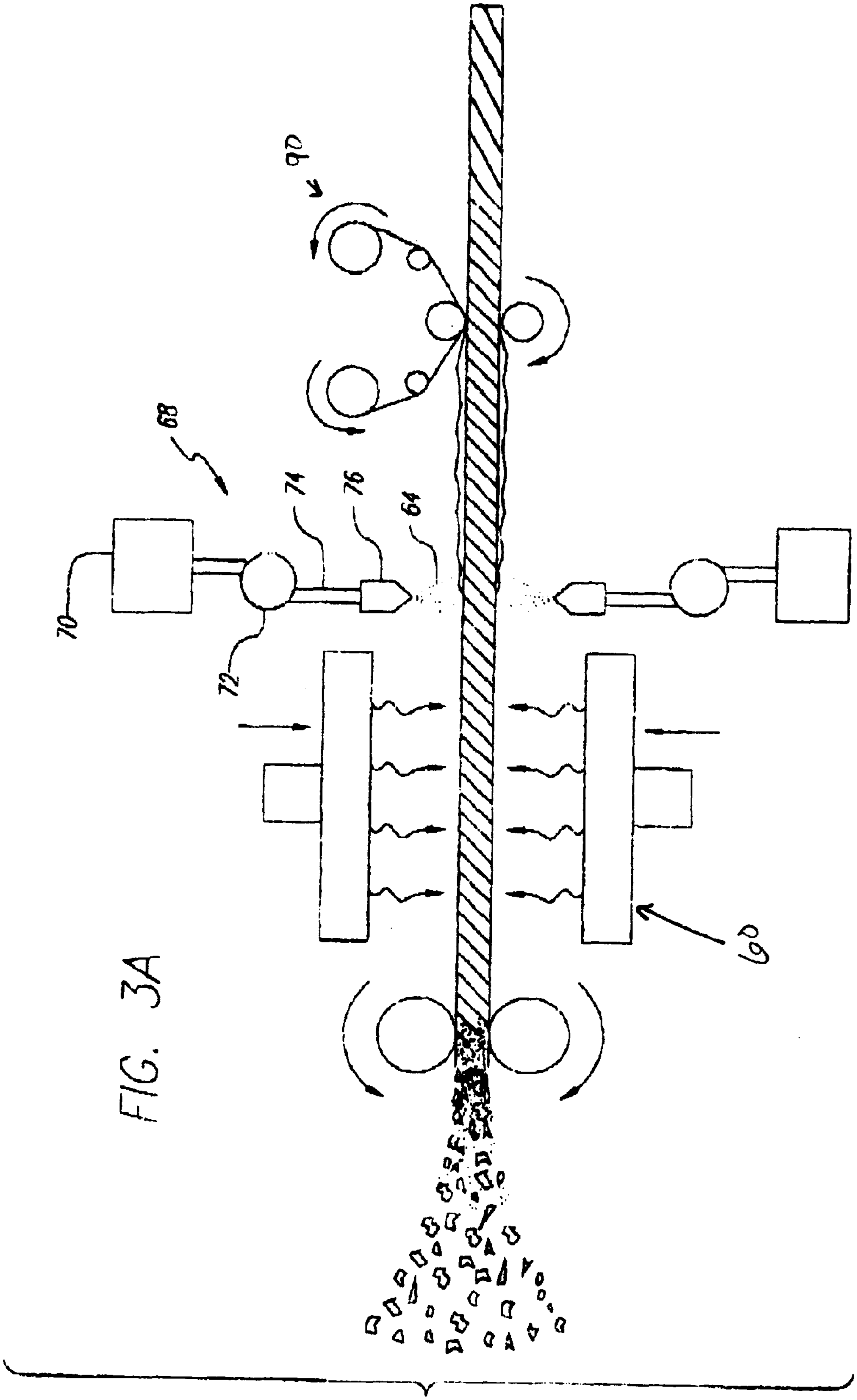
FIG. 3A is a schematic view of an engineered wood products hot press and coating applicator used in the process of the invention.
Figure 3B:
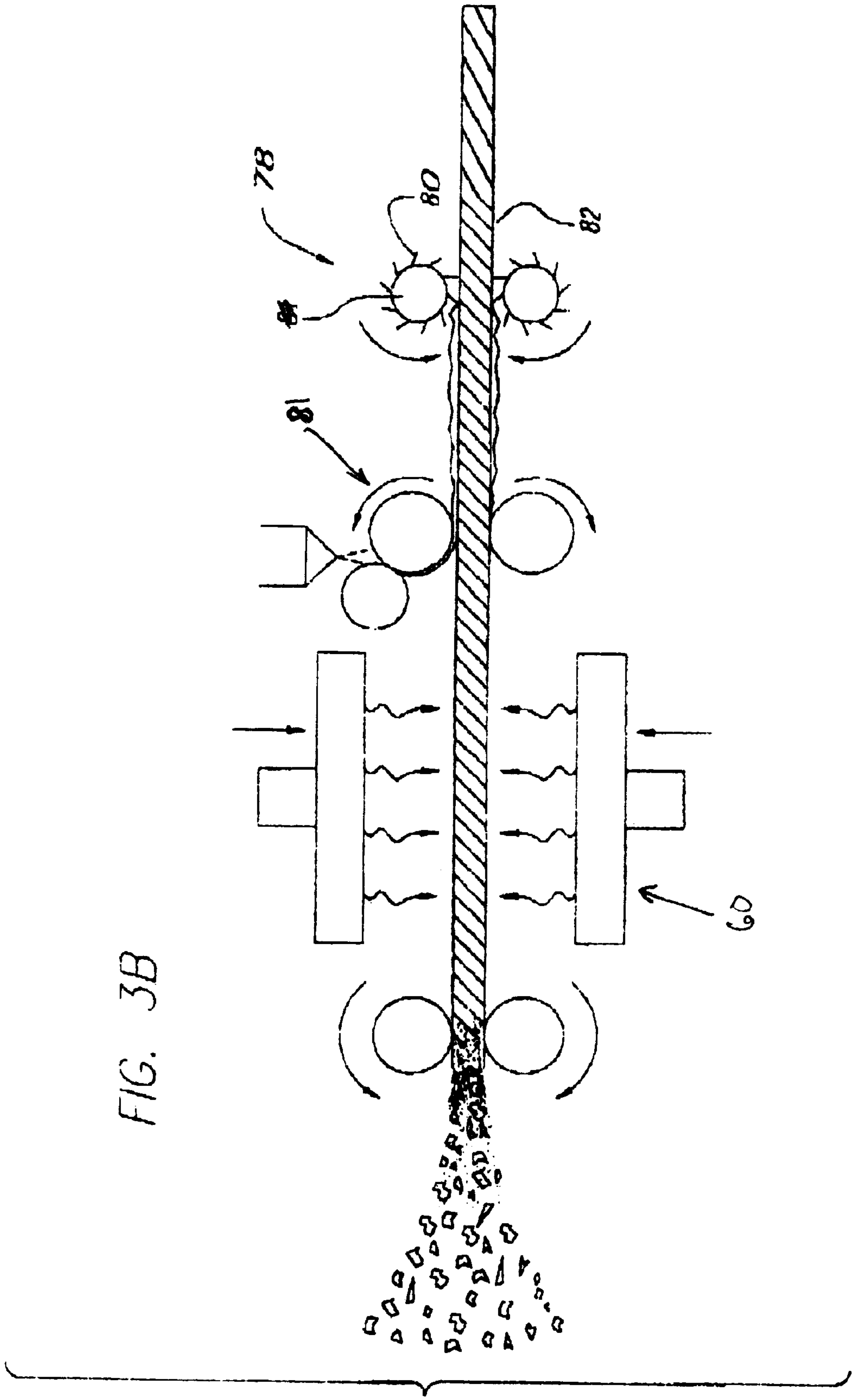
FIG. 3B is a schematic view of an alternative embodiment of the press and applicator of FIG. 3A.

In the embodiment shown in FIGS. 3A and 3B, the flowable but thixotropic polymer compound is applied by a putty dispensing apparatus 68. This machine includes tanks 70 containing the separate elements of a plural component polymer 64, at least one pump 72 or hydraulic extrusion device, a flow line 74 and dispensing nozzles 76 which may be static mixer nozzles to combine the component elements in appropriate meter measure quantity and ratio. The nozzles apply the polymer compound 64 across the surface of the panel 78 as the wood substrate 62 passes beneath them after exiting the heat press. The polymer compound 64 is distributed smoothly across the surface of the wood substrate 62 by the action of a doctor blade 80 or a paper roll coater 90. As shown in FIG. 3B, the apparatus may also include a reverse roll coater 81 in place of a nozzle applicator. The action of the doctor blade or reverse roll coater creates a smooth continuous coating 82 on one side of the wood substrate 62. The coating thickness may be varied depending on the needs of the manufacturer. Thicknesses of about 1/100" to 1/64" inches are preferred for filling. A thickness of 1/100" inch is generally suitable for such substrates as particle board, which have a smoother surface. A greater thickness such as 1/64" or 1/32" inch may be needed for the rougher surface of plywood. Oriented strand board may be coated with a thickness which will vary across the surface of the sheet from 1/100" to 1/40", or even 1/32" if severe voids or gaps are present in the surface of the wood panel substrate.

In addition to the filling of gaps and defects, certain strength or durability requirements can be achieved by rapidly building cured coating thickness. Buildups to about 1/4" or more are possible in portions or across the entire surface of the substrate. The coated wood substrate may then be set aside to allow the polymer to bond to the wood substrate and cure. Alternatively, another surface of the substrate may be coated in a similar manner, or the entire substrate may be encapsulated on all surfaces with the polymer compound. The polymer compound is aided in bonding and curing by the heat radiated from the wood substrate as it cools to ambient temperature, enabling the polymer compound to bond more firmly and quickly to the substrate and to cure and harden more rapidly than would normally be expected. The need for heating the polymer after application or reheating the substrate, which could adversely affect the integrity of the substrate, is avoided. When a polymer compound is accelerated in curing by the addition of a catalyst, an exothermic reaction takes place, thereby completing and curing the bonding process.

When a catalyzed polymer is applied in a thick mass to a substrate the density of the mass aids in retaining the heat and promoting exothermic reaction. If the catalyzed polymer is applied to the ambient temperature surface of the substrate as a thin film for coating or filling, the curing process is generally slowed because the mass of the polymer at a given location on the substrate is reduced, thus slowing the exothermic reaction. Cures can be accelerated by the addition of a greater volume of catalyst. The present method uses the residual heat radiating from the post-pressed cooling substrate to promote and accelerate the cure. Thus, the residual heat substitutes for the need for additional volumes of catalyst or an increased mass of polymer coating.

Figure 4:
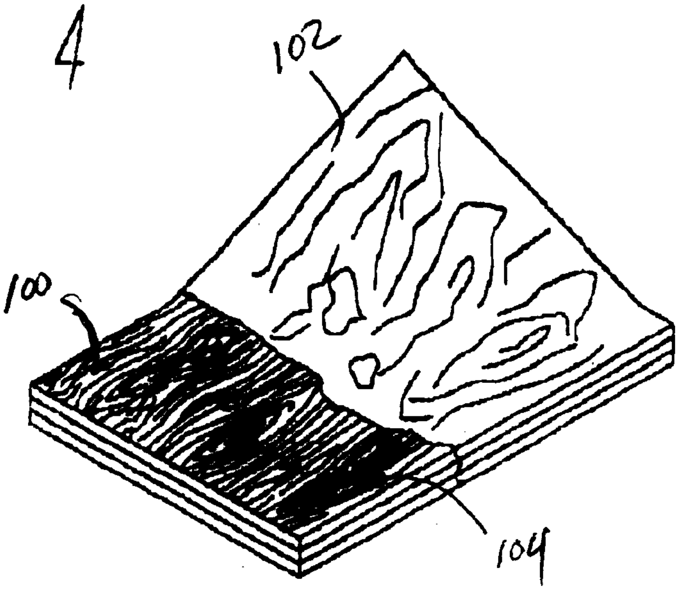
FIG. 4 is a perspective view of a coated composite wood product with a decorative pattern embossed on the coating.

With reference to FIG. 4, prior to curing and hardening, the coating 100 which covers the wood substrate 102 may be embossed, stamped, or squeegeed with decorative patterns such as plows, scrolls, beads, zig-zags or simulated wood grain 104.

After the polymer compound has cured and hardened, the coating can provide a seamless, durable, smooth and continuous surface that is water or insect impervious. The heat-assisted bond between the polymer compound and the wood substrate can serve to increase the strength and rigidity of the product. The heat required to bond wood veneer layers, strands, chips and shavings with thermal setting adhesive tends to evaporate most of the moisture naturally found in the wood, reducing the moisture content to a level substantially below ambient moisture. This evaporation can result in distortion and tension induced degradation of the cellulose bonds found in the wood, and consequently, can stress and weaken the products. However, the polymer compound bond provides a compensating additional layer of material to consolidate the product, thereby reinforcing the cellulose bonds and giving the product greater rigidity, stability, and tensile, radial and tangential strength. The resulting coated wood product can be sanded to create a smoother or rougher surface, or can be machined to resemble a milled or grained pattern such as wood siding, much like traditional uncoated natural surface wood products. However, the coated product will have greater resistance to moisture, improved strength and greater durability than the uncoated natural surface wood products.

In some embodiments, a flowable but thixotropic polymer compound is applied to a wood substrate by spray jet. For example, a sprayable polymer compound, such as Laminex™ Sprayable Syntactic Compound, is applied by spray jets to one or more surfaces of a wood substrate. This ability to coat the sides, edges, ends, or even completely encapsulate the wood substrate, results from the thixotropic nature of the polymer compound, i.e., it is able to adhere to a surface, or to itself, without dripping or running excessively. Thus, laminated wood products can be taken from a heat press and, prior to being conveyed into a linear board cooler or rotating board cooler, may easily and without significant additional material handling cost be spray coated with a flowable but thixotropic polymer compound by spray jets while in an upright position. This can be accomplished while the product is in transit to a curing/storage area or while it is on a flat panel conveyor for moving the just pressed product out of a press onto a cooler prior to further saw sizing and sanding.

Figure 5:
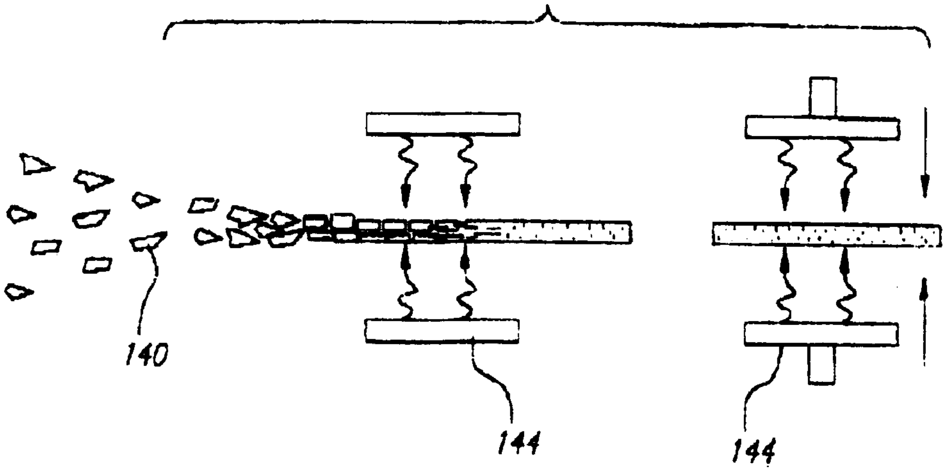
FIG. 5 is a schematic view of a composite wood product hot press and coating applicator.
Figure 6:
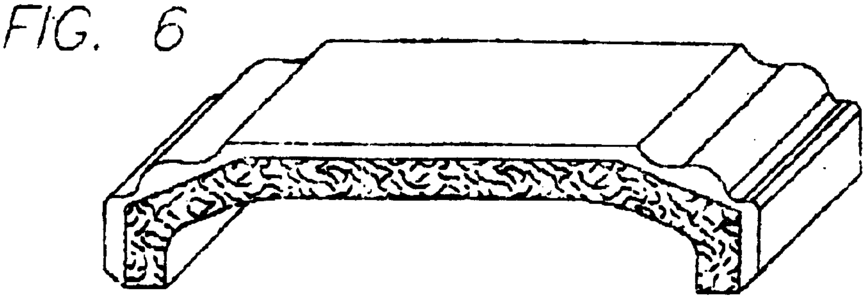
FIG. 6 is a perspective view of a moulded, coated composite wood product.

A similar manufacturing and coating process may be applied to particulate wood products. (FIG. 5). Wood fragments 140 are fed into forms, and a thermal setting adhesive is mixed with the wood fragments. This mixture is then introduced into a heat press 144, where pressure and heat bond the wood fragments into a single solid composite wood substrate 146. The composite wood product may be a flat sheet or panel or it may be moulded into a shape such as a car headliner, trunkliner or a cabinet door raised door panel or moulding (FIG. 6). Typically, the wood fragments reach a surface temperature of about 120° C. in the heat press 144. After the composite wood product 146 is removed from the heat press 144, it is coated by a flowable but thixotropic polymer compound in the manner previously described for laminate wood products. This seals, consolidates and strengthens the product, making it more durable, more stable, less fragile and less susceptible to moisture degradation.

Substrates of various vegetable fibers in lieu of or in addition to wood may be used in the processes described above. Examples of such other fibers include wheat straw, rice straw, kenaf, hemp and bagasse. These fibers are increasingly being substituted for wood fibers. The pressing properties make them equally suited to the above laminating process.

Wood products manufactured by either composite or laminating processes can be used in many different applications. For example, they can be used as packing, automotive or building materials to which additional surface improving materials, such as laminating printed paper, thin decorative wood veneers, metallic particles, paint or vinyl overlays, fire retardants, or weather protective agents may be added. The even, flat and smooth surface provided by the polymer coating prevents telegraphing of subsurface imperfections into the veneer, paint or vinyl. Or, polymer compounds of specific desired colors may be selected, so that products made by the above-described methods can be substituted for lacquered, laminated, post formed or vacuum formed vinyl, or melamie covered products in applications such as kitchen cabinet doors, shelves or drawers. Finally, coated wood products may be sanded or polished. Designs may be stamped or worked into the polymer coating before it cures and hardens, or embossed and machined into it after hardening.

From the foregoing, it will be appreciated that the polymer coating process of the present invention provides a method for improving the appearance of wood laminate and composite products that is relatively inexpensive, labor efficient, stronger and results in a continuous smooth surface that is more free of imperfections and resistant or impervious to moisture and weathering. These and other advantages give the polymer coating process of the present invention a definite advantage in the area of manufacture of laminate and particulate wood products.

While particular forms of the invention has been illustrated and described, it will be apparent that various modifications can be made without departing from the spirit and scope of the invention. Accordingly, it is not intended that the invention be limited, except as by the appended claims.

I claim:

1. A method for the production of laminated wood products comprising:

(a) applying a thermal setting adhesive to a plurality of sheets of wood veneer;

(b) heating the plurality of sheets of wood veneer to a temperature above ambient temperature and applying pressure to the plurality of sheets of wood veneer, thereby causing the plurality of sheets of wood veneer to be bonded to one another by the thermal setting adhesive, and creating a layered wood substrate;

(c) before the layered wood substrate cools to ambient temperature, applying a solvent-free flowable but thixotropic polymer coating material to one or more surfaces of the layered wood substrate;

(d) distributing the polymer coating material evenly across one or more surfaces of the layered wood substrate such that any holes and imperfections in said surface are filled and a smooth continuous surface is created; and (e) allowing the polymer coating material to bond to one or more surfaces of the layered wood substrate and cure to form one or more hard, smooth surfaces over the layered wood substrate surface.

2. The method of claim 1 further comprising:

(f) applying a treatment to the distributed polymer coating, such that the laminated wood products may be stacked before the polymer coating has fully cured and without bonding to one another.

3. The method of claim 2 wherein the treatment is a plastic sheet.

4. The method of claim 2 wherein the treatment is a paper sheet.

5. The method of claim 2 wherein the treatment is sawdust.

6. The method of claim 2 wherein the treatment is sanderdust.

7. The method of claim 2 wherein the treatment is calcium carbonate.

8. The method of claim 1 further comprising applying a cosmetic appearance enhancing treatment to the distributed polymer coating before the polymer coating has cured.

9. The method of claim 1 wherein the coating material is selected from the group consisting of polyurethane, polyester, polyurea and combinations thereof.

10. The method of claim 1 wherein the coating is applied to all surfaces of the substrate so as to encapsulate the substrate.

11. The method of claim 1 wherein the coating material is selected from the group consisting of polyurethane, polyester, polyurea and combinations thereof, and is applied to all surfaces of the substrate so as to encapsulate the substrate.

12. The method of claim 1 wherein the plurality of sheets of wood veneer are arranged such that the predominate direction of the wood grain of each sheet is perpendicular to the predominant direction of the wood grain of any adjacent sheets.

13. The method of claim 1 wherein the plurality of sheets of wood veneer are arranged such that the predominant direction of the wood grain of each sheet is in the same direction as the predominant direction of the wood grain of any adjacent sheets.

14. The method of claim 1 wherein the polymer coating material is applied while the surface temperature of the wood substrate is greater than 20° C.

15. The method of claim 1 wherein the polymer coating material is applied while the surface temperature of the wood substrate is between about 20° C. and 90° C.

16. The method of claim 1 wherein the polymer coating material is applied to the wood substrate while the surface temperature of the wood substrate is between about 40° C. and 50° C.

17. The method of claim 1 wherein the polymer coating material is applied by a plurality of nozzles after the layered wood substrate emerges from the device where the plurality of sheets of wood veneer are heated and bonded but before the substrate has cooled to ambient temperature.

18. The method of claim 1 wherein the polymer coating material is applied by at least one spray jet after the layered wood substrate emerges from the device where the plurality of sheets of wood veneer are heated and bonded and before the substrate has cooled to ambient temperature.

19. The method of claim 1 wherein the polymer coating material is catalyzed by a catalyst selected from the group consisting of methyl ethyl ketone peroxide, benzoyl peroxide, isocyanate resins, Diphenylmethane Disocyanate resins, and polyoxy propylenediamine diethyltoluenediamine resins.

20. The method claim 1 wherein the polymer coating material includes calcium carbonate.

21. The method claim 1 wherein the polymer coating material includes silicates.

22. The method claim 1 wherein the polymer coating material includes microspheres.

23. The method claim 1 wherein the polymer coating material includes talc.

24. The method claim 1 wherein the polymer coating material includes sawdust.

25. The method claim 1 wherein the polymer coating material includes sanderdust.

* * * * *